Nov. 7, 1950  D. M. SWARTHOUT  2,528,561
BAKING PAN WITH SEPARATOR BLADE THEREFOR

Filed July 27, 1949

INVENTOR.
DOROTHY M. SWARTHOUT

BY Fay, Golrick & Fay
ATTORNEYS

Patented Nov. 7, 1950

2,528,561

UNITED STATES PATENT OFFICE 2,528,561

BAKING PAN WITH SEPARATOR BLADE THEREFOR

Dorothy M. Swarthout, Kewaskum, Wis.

Application July 27, 1949, Serial No. 107,119

3 Claims. (Cl. 99—422)

1

The present invention relating as indicated to a baking pan for baking cookies, biscuits, tarts and the like in an oven, is more particularly directed to a cookie pan with a separator blade to aid in the ready removal of cookies and biscuits from a hot baking pan making it more convenient and faster for the operator to perform this operation.

In the past there has been considerable trouble in removing a large number of cookies, biscuits and tarts from a baking pan in order to provide for its reuse with another batch of dough because each separated cookie or tart had to be picked up separately and placed on the cooling tray with a knife, pancake turner or spatula. This required a large number of repetitive operations which were slow and laborious. In my invention I am able to avoid this slow process and remove all the baked goods in a single movement of my separator blade.

More specifically my invention consists of a rectangular baking pan having stiffening flanges on three sides and a longitudinal slot down the center of the pan to guide the separator blade. Within this slot there is a clamping shoe that retains the depressed edge of the slot within a pair of grooves and upon the baking surface of the pan is a separator blade mounted on the shoe and secured to the shoe by a handle and fastening means. This specific mechanism is designed to remove the baked goods from a pan by cutting the goods from the baking pan in a single movement of the separator blade, thus making the operation much more simple and convenient.

An object of this invention is to provide a baking pan having means associated with said baking pan for ready removal of a large number of individual pieces of baked goods in a quick and convenient manner.

Other objects and advantages of the invention will be apparent from the following description of a preferred form of the invention, reference being made to the accompanying drawings wherein.

My improved article consists generally of a

Figure 1:
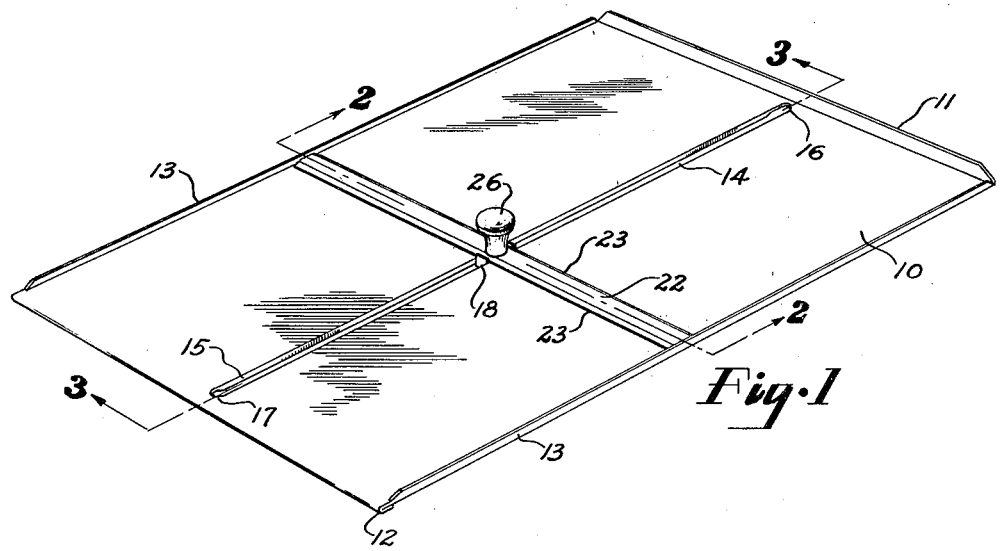
Fig. 1 is a perspective view of the baking pan with separator blade.
Figure 2:
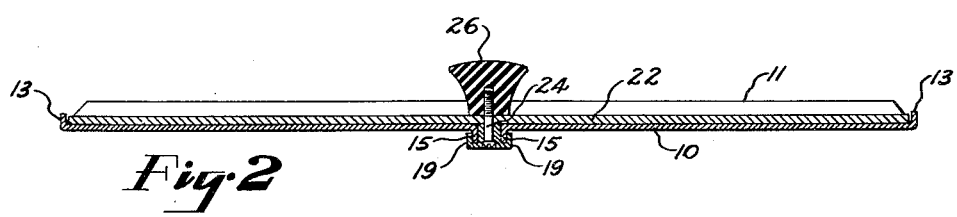
Fig. 2 is a cross sectional view along lines 2—2 of Fig. 1 through the separator blade and handle.
Figure 3:
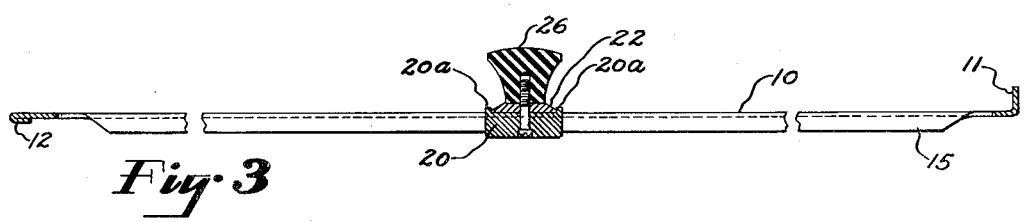
Fig. 3 is a cross sectional view along lines 3—3 of Fig. 1 through the handle and shoe member.
Figure 4:
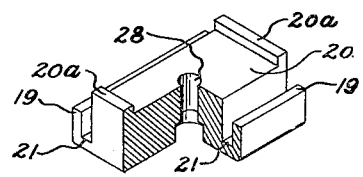
Fig. 4 is a separate partially sectioned view of the shoe for clamping the blade within the longitudinal slot.

2 baking pan in the form of a metal sheet 10 having an upturned flange on one end 11 and a rolled flange on the other end at 12. The side flanges designated 13, 13 project vertically a shorter distance than flange 11. Within the sheet 10 there is a longitudinal slideway slot or groove 14 formed by depressing from the plane of the sheet two flanges 15, 15. This slot 14 is terminated in a rounded end 16 at one end and a similarly rounded end 17 at the other end. Within the slot and adapted to move longitudinally of the pan is an integral slide and spacer structure or shoe shown separately in Fig. 4 and generally at 18 in Fig. 1. This shoe may be made in various forms but in this as a preferred form it is shown as having a pair of side flanges or legs 19 and a solid, elongated center spacer portion 20 having transverse end flanges or shoulders 20a projecting above the center portion which slides within the groove 14, whereas the side flanges 19 are positioned outside of the depressed flanges 15 of the sheet 10. Thus, it is seen that this combination of side flanges and center spacer section are positioned apart by a connecting neck portion 21 to provide longitudinal grooves within the body of the shoe. The grooves thus formed guide the shoe slide within the slideway slot 14. Centrally disposed in the shoe is a vertical bore 28.

Fixed to the shoe and contained between the shoulders 20a of the spacer and flush with the cooking surface of the pan is a separator blade 22 having two edges with graduated or knife-like portions 23. This aids removal of the cookies or tarts as the knife-like edge slides along the sheet 10. It follows the conformations of the sheet and cuts or removes the tarts which may be stuck to the sheet. It is, of course, understood that only a single edge of the separator blade 22 need necessarily be sharpened or reduced in thickness to a knife-like edge but for convenience of the operator both edges of the blade may well be of reduced thickness. Upon the blade 22 above the position of the shoe 18 is a knob handle 26 connected to the shoe by a screw 24 extending through the bore 28. This fixedly attaches the handle, blade and shoe together to provide for a fairly rigid connection between the blade and the shoe that allows an operator to move the blade along the surface of the sheet 10 cutting the cookies therefrom.

In my preferred form, I have chosen to make the cookie sheet oblong in shape with dimensions about 14 5/16" wide by 16 5/16" in length, however, it is readily appreciated that other sizes of the board may be made particularly adapted for certain ovens. The upturned flange shown generally at 11 upon the end of the width or shorter side of the sheet has an abrupt vertical flange adapted to provide a surer grip of the sheet for removal from the oven. The opposite flange is rolled and provides a surface over which the cookies or tarts may slide in the removal thereof. The side flanges along the long dimension of the sheet are turned up a shorter distance than the end flange 11 to provide rigidity for the sheet to prevent the sheet from bending out of shape in cooking or cleaning. A slot 14 preferably ¼" wide from the front to the rear of the sheet is formed therein by depressing two flanges on each side of the sheet downwardly from the cooking surface of the sheet. This longitudinal slot approaches within ½" of either end of the board to allow the separator blade to move longitudinally throughout the entire surface of the sheet. Upon this sheet the separator blade moves across the entire width of the sheet within a very short distance of the edge of the upturned side flanges 13. The length of this blade in my preferred embodiment in 14⅛" long.

The body of the sheet is made of aluminum but the separator blade is made of carbon steel or very thin stainless steel. Under certain conditions the blade might be made of tin plate. The knob on the separator blade that fixes it to the sheet is of a heat resistant resin material, to enable it to withstand the temperature in the oven.

In operation, this cookie sheet with separator blade would be removed from the oven with a cloth or other protective means touching near the upturned flange 11 on the end of the board. Then the bottom or rolled flange 12 would be rested upon the table top so that the sheet would be held on the slant. The blade would then be moved in the slot throughout the length of the sheet from the bottom or rolled flange edge to the upward end allowing the cookies to slide off the sheet once they were cut loose by the passage of the blade beneath them. Of course, it is understood that though I have described my invention as used for the baking of cookies, biscuits, tarts and the like, other baked goods of the same general nature may be cooked and removed therefrom with equally successful results.

Although I have described but one form of embodiment of the invention, it is to be understood that other forms might be adopted, all falling within the scope of the claims which follow.

I claim:

1. In a baking pan with separator blade, the combination of a rectangular metal sheet with stiffening flanges on all sides of the sheet having a longitudinal slot formed therein with depressed flanges along each side of the slot, a shoe within said slot having two parallel grooves adapted to fit the depressed flanges of the slot, a separator blade, having a thin edge on at least one side of the blade, mounted on the shoe flush with the cooking surface of the pan and extending crosswise of the width of the sheet and a handle fastened to said blade and shoe to move the separator blade across the surface of the sheet to remove the baked goods therefrom.

2. In a baking pan with separator blade, the combination of a rectangular metal sheet with stiffening flanges on the sides of the sheet having a single longitudinal slot centrally of the sheet with depressed flanges along each side of the slot, a shoe within said slot having two parallel grooves adapted to fit the depressed flanges of the slot, a separator blade having a thin edge on at least one side of the bladed and mounted on the shoe flush with the cooking surface of the pan extending crosswise of the width of the sheet, and a handle fastened to said blade and shoe to move the separator blade across the surface of the sheet to separate the baked goods therefrom.

3. In a split surface baking pan, the combination of a rectangular metal sheet having integrally formed stiffening means about the periphery thereof, a pair of longitudinally extending centrally disposed flanges formed from the sheet and projecting downwardly substantially normal to the baking surface of the sheet forming a longitudinal slideway therein, an integral slide and spacer structure adapted to cooperate in said slideway and having outer legs thereof adapted to fit slidably outside the downwardly extending sheet flanges, and with a center spacer section of greater vertical depth than said legs adapted to fit slidably in the longitudinal slideway, said spacer section having upwardly projecting shoulders at each end thereof, a transversely extending separator blade having a thin edge on at least one side of the blade mounted on the spacer section slide structure flush with the sheet surface, said blade being positioned between the shoulders of the spacer section of the slide, and a handle rigidly secured to said blade and slide structure, and being adapted to move the blade across the surface of the sheet to separate baked goods therefrom.

DOROTHY M. SWARTHOUT.

No references cited.